United States Patent [19]

Barker et al.

[11] Patent Number: 5,129,052
[45] Date of Patent: Jul. 7, 1992

[54] DYNAMIC SELECTION OF RECURSIVELY NESTED LOGICAL ELEMENT DATA FORMATS

[75] Inventors: Barbara A. Barker, Round Rock; Thomas R. Edel, Austin; Jeffrey A. Stark, Grapevine, all of Tex.

[73] Assignee: International Business Machines Corporation, Armonk, N.Y.

[21] Appl. No.: 395,857

[22] Filed: Aug. 18, 1989

[51] Int. Cl.⁵ .............................................. G06F 15/20
[52] U.S. Cl. ...................................... 395/148; 395/158
[58] Field of Search ................ 364/521, 523, 518; 395/148, 145, 146, 147, 156–161

[56] References Cited

U.S. PATENT DOCUMENTS 5,033,008  7/1991  Barker et al. ........................ 364/523

Primary Examiner—Heather R. Herndon
Attorney, Agent, or Firm—Andrew J. Dillon

[57] ABSTRACT

A method for dynamically selecting data formats for logical elements which are recursively nested within a document. A data processing system user is initially interactively prompted to establish logical element data formats which correspond to the order of appearance of a logical element within a nested relationhip and the level within that nested relationship where the logical element appears. Thereafter, the creation or relocation of a logical element within the document will result in a data format being automatically assigned based upon the order of appearance and the level of that logical element within the nested relationship within the document.

6 Claims, 8 Drawing Sheets

DYNAMIC SELECTION OF RECURSIVELY NESTED LOGICAL ELEMENT DATA FORMATS

CROSS-REFERENCE TO RELATED APPLICATION

This application is related in subject matter to U.S. Pat. No. 5,033,008, issued Jul. 16, 1991, entitled "Dynamic Selection of Logical Element Data Format," by the inventors hereof and assigned to the assignee herein. The disclosure of the prior filed application is incorporated herein by reference thereto.

BACKGROUND OF THE INVENTION

1. Technical Field

The present invention relates in general to document control architectures for use in data processing systems and, more particularly, to a technique for the dynamic selection of logical element data formats based upon logical element characteristics which are established as a document is created or modified. Still more particularly, the present invention relates to a technique for the dynamic selection of recursively nested logical element data formats based upon the order of appearance and level within a nested relationship for each logical element.

2. Background Art

When editing a document with known text editing systems, changes in logical element relationships do not dynamically result in changes to the format of the data portion of each logical element. For example, an author may indent the first paragraph of each section of a document and block subsequent paragraphs in the document. When the first paragraph of a section is moved using existing state of the art text editors, paragraph reformatting must be explicitly specified by the user if the movement results in a change of paragraph order within sections. New first paragraphs which were originally blocked must now be indented by entering indent commands or by linking the paragraph to a style sheet that specifies identified paragraph style. Similarly, indented paragraphs which are no longer first paragraphs must now be blocked by entering commands which cancel the indenting or by linking that paragraph to a style sheet which specifies blocked paragraph style.

A specific example in the so-called desktop publishing field is the Ventura Publisher produced by the Xerox Corporation. This product utilizes style sheets into which text, graphic, table and/or image data may be imported from other application programs such as word processors, spread sheets or the like. A selected number of style sheets are included with the product, and the user may generate other style sheets either by modifying existing style sheets or by creating new style sheets by inputting the specifications for those style sheets.

Once text has been imported, chapter headings, subheadings, first paragraphs and other document elements may be tagged, resulting in formatting of the data according to predefined characteristics contained within the style sheets. For example, the first paragraph of a chapter might be formatted blocked with the first letter of the first sentence being a 36 point typesize of a particular font with the remainder of the text characters in 10 point typesize and flowing around the first letter. However, in the course of editing the document, if the first paragraph is moved or changed, then the tags must be deleted and new tags applied to the new first paragraph.

Thus, it should be apparent that these tags are attached to and associated with each document element such as a paragraph, title, heading or the like.

More recently, in the cross-referenced application noted above, it has been proposed to provide a method by which the format of the data portion of a logical element may be dynamically modified as the data is created or edited by making a decision as to what data format will be used based upon logical element characteristics such as the parent of the logical element, and the sequence of the logical element among other logical elements. While this represents an advance in the art, this technique does not recognize the possibility of recursively nested logical elements within a document wherein multiple relationships may occur between two logical elements within a loop structure in a document.

Thus, it should be apparent that a need exists for a method whereby the data format of a logical element within a recursively nested group of logical elements may be dynamically selected based upon the order of appearance of a logical element within a nested relationship and the level within the nested relationship where that logical element appears.

SUMMARY OF THE INVENTION

It is therefore one object of the present invention to provide an improved method for document control within a data processing system.

It is another object of the present invention to provide an improved method for document control within a data processing system which permits the dynamic selection of a logical element data format.

It is still another object of the present invention to provide an improved method of document control within a data processing system which permits the dynamic selection of recursively nested logical element data formats based upon the order of appearance and level of a logical element within a nested relationship.

The foregoing objects are achieved as is now described. The method of the present invention permits the dynamic selection of data formats for logical elements which are recursively nested within a document. A data processing system user is initially interactively prompted to establish logical element data formats which correspond to the order of appearance of a logical element within a nested relationship and the level within that nested relationship at which the logical element occurs. Thereafter, the creation or relocation of a logical element within the document will result in a data format being automatically assigned based upon the order of appearance and level of that logical element within the nested relationship.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
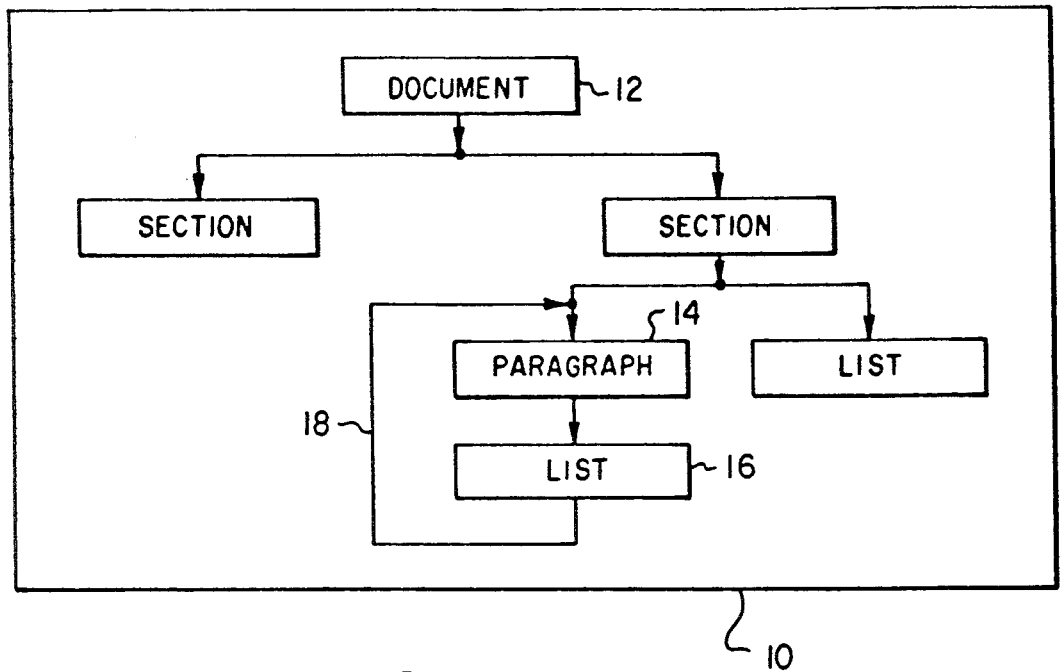
FIG. 1 is a schematic representation of a document definition which includes recursively nested logical elements.

With reference now to the figures and in particular with reference to FIG. 1, there is depicted a schematic representation of a document definition 10 which includes recursively nested logical elements. As may be seen, document definition 10 describes the logical element subordinates for document 12. Document 12 includes two sections, one of which includes paragraph 14 and list 16 as logical elements which have a recursive relationship denoted by line 18.

When a recursive relationship exists, a single parent-child relationship is insufficient to specify format definitions for the multiple parent-child relationships which may exist. Multiple parent-child relationships may exist when there is recursion within a logical document definition and a loop including two or more logical elements is established. Each pass through a loop of logical elements establishes a different parent-child relationship in that the depth characteristic is different. By depth characteristic what is meant is the current iteration count indicating the number of times the document has utilized the loop in question. Each pass through the loop establishes a parent-child relationship that is one level "deeper" than the current parent-child relationship. Each event which terminates an outstanding parent-child relationship will restore the parent-child to the next higher level within the iterative loop.

Therefore, it is necessary to provide a more flexible approach which will support multiple logical element format definitions for a set of parent-child relationships between the same logical elements when those logical elements are nested recursively.

Figure 2:
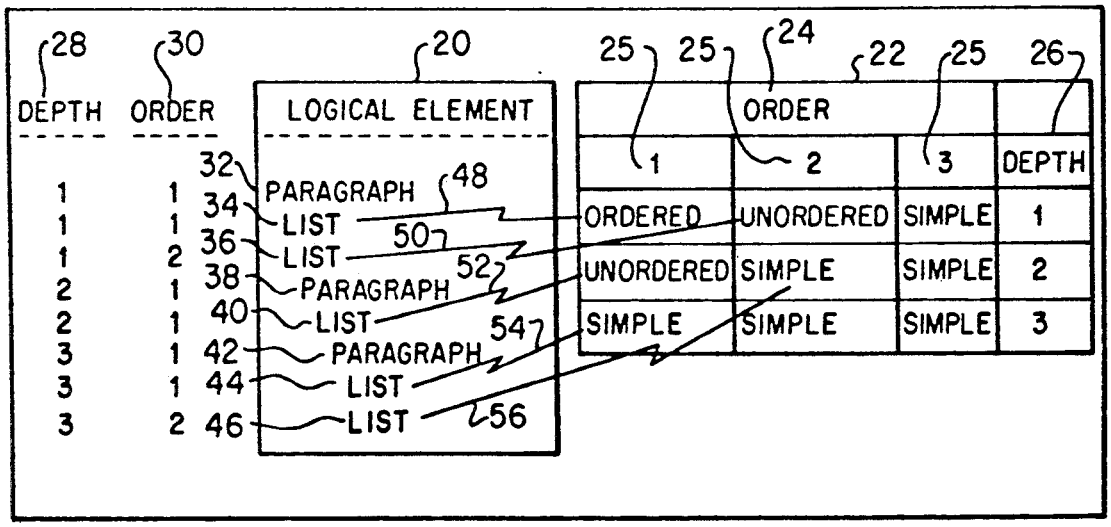
FIG. 2 is a schematic representation of a format definition table for recursively nested logical elements in accordance with the method, of the present invention.

Referring now to FIG. 2, there is depicted a schematic representation of a format definition table for recursively nested logical elements which may be utilized in accordance with the method of the present invention. As may be seen, the format definition table includes an actual data stream representation 20 which specifies a number of logical element instances which are associated with the illustrated example.

As may be seen, actual data stream representation 20 is associated with a format specification construct 22 which includes both rows and columns. As is illustrated, format specification construct 22 includes three rows 25 which each specify format definitions for logical element instances which are based upon the order of appearance of those logical elements for the same parent element. This order of appearance is also listed separately under the column labeled 30.

Additionally, the columns of format specification construct 22 specify format definitions for logical elements based upon their recursive depth level within the nested relationship. This recursive depth level is also expressed within the column labeled 28.

For example, in actual data stream 20 which is comprised of multiple logical element instances, Paragraph 32 and Lists 34 and 36 are indicated as being at depth one. Paragraph 38 and List 40 are at depth two, and Paragraph 42 and Lists 44 and 46 are at depth three within the recursive nested relationship.

Format definition construct 22 has been created for utilization with Lists but may also be utilized by other logical elements, if appropriate. Utilizing format definition construct 22, List 34 will be formatted as an ordered list, as denoted by line 48. Lists 36 and 40 will be formatted as unordered lists, as denoted by lines 50 and 52 respectively. Similarly, Lists 44 and 46 are formatted as simple lists, as denoted by lines 54 and 56, respectively.

The format definitions for Paragraphs 32, 38 and 42 may also be varied depending upon their order and depth within a recursively nested relationship utilizing another format definition construct which has been created to provide paragraph format definitions. Format definition construct 22 has been arbitrarily limited to three columns and three rows; however, those skilled in the art will appreciate that such a construct may contain any number of columns and rows with any number of entries in each column and row. Similarly, the number of columns may be different from the number or rows or vice versa. Likewise, the order and content of the format definitions in format definition construct 22 is arbitrary and may be placed in any order with any acceptable set of format definition attributes.

Figure 3:
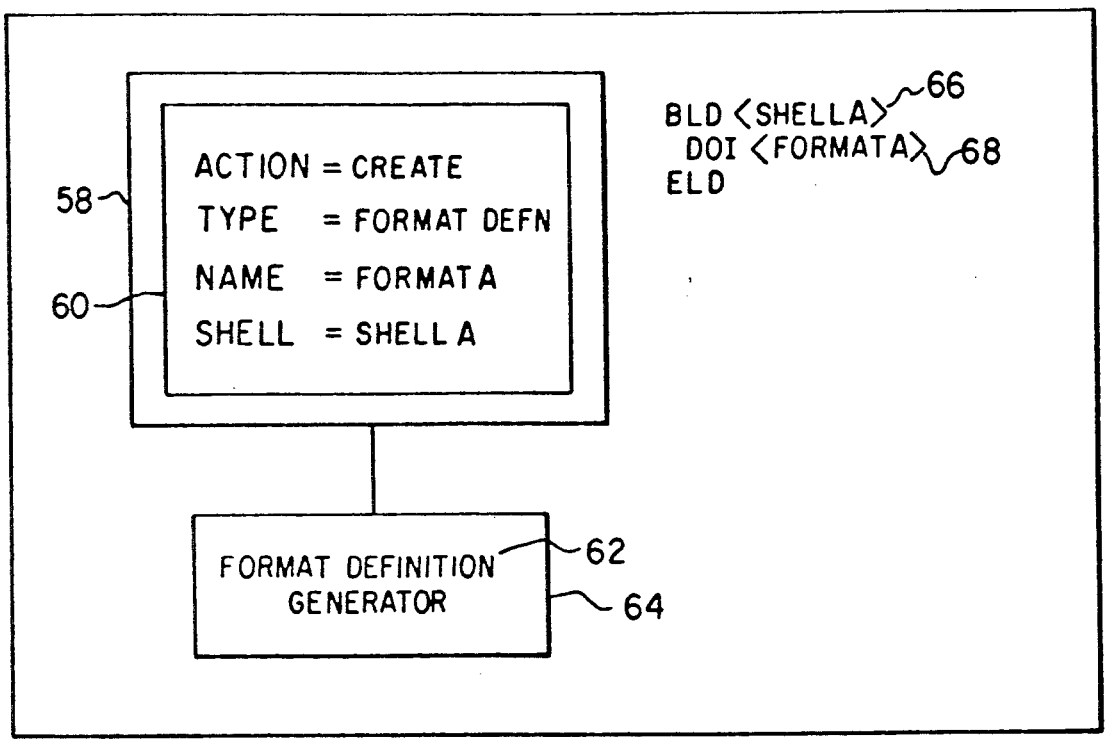
FIG. 3 is an illustration of a computer screen depicting the creation of a data format specification in accordance with the method of the present invention.

With reference now to FIG. 3, there is illustrated a computer screen 58 which depicts the creation of a data format specification in accordance with the method of the present invention. As may be seen, computer screen 58 may be utilized to display a format definition creation menu 60. Format definition creation menu 60 is presented by an application 62 which is preferably running on a device 64, such as a computer terminal or work station, which has been initiated by an operator of device 64. Application 62 may be utilized to create or modify a format definition construct in accordance with the method of the present invention.

As is illustrated, the operator of computer device 64 has entered "Create" after the "ACTION=" prompt, "Format Defn" after the "TYPE=" prompt, "FormatA" after the "NAME=" prompt, and "ShellA" after the "SHELL=" prompt. Thereafter, application 62 will access Format Definition Shell "ShellA." If Format Definition Shell "ShellA" does not exist, application 62 will create a Format Definition Shell by automatically generating a begin/end for Format Definition Shell "ShellA," as indicated at reference numeral 66.

After accessing or creating Format Definition Shell "ShellA," application 62 will create a format definition construct 68 within Format Definition Shell "ShellA" 66. Application 62 then displays prompts on screen 58 and the answers to those prompts which are entered by the operator of device 64 will be utilized to complete Format Definition Construct 68. The name which has been entered by the operator, "FormatA," is then automatically assigned as the name of the Format Definition Construct by application 62.

Figure 4:
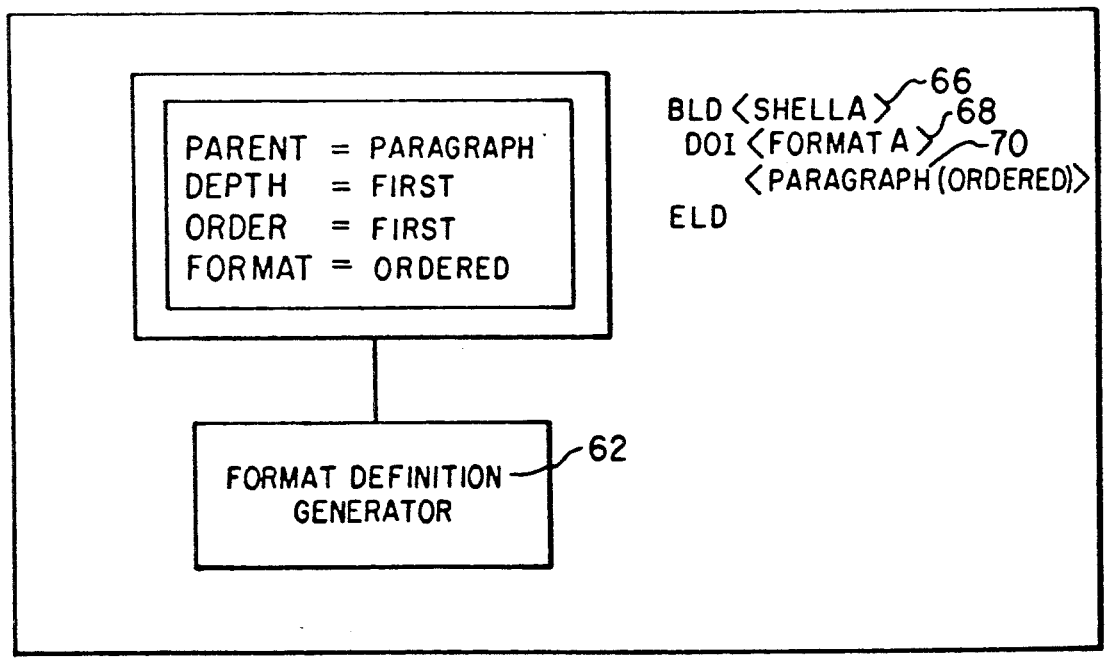
FIG. 4 is an illustration of a computer screen depicting the specification by the operator of data format values in accordance with the method of the present invention.

Referring now to FIG. 4, there is depicted an illustration of a computer screen 58 which depicts the specification by the operator of data format values in accordance with the method of the present invention. As is illustrated, computer screen 58 is preferably utilized to display the prompts which are utilized to receive information from the operator which may be utilized to create a format definition construct within Format Definition Shell "ShellA." In response to the prompt "PARENT=," the operator specifies "Paragraph," thereby declaring the parent for Format Definition Construct 68 to be the logical element which is named Paragraph. Other logical elements such as Section, List, Prologue, Index, Subsection, Table of Contents, and Abstract are also available to the operator. Application 62 then adds Paragraph as an argument for parent to Format Definition Construct 68, thereby noting that Paragraph is a parent logical element for the format definition specified in Format Definition Construct 68.

In response to the "DEPTH=," the operator selects "First," thereby declaring that Format Definition Construct 68 will contain at least one row to specify the format characteristics of all depth one children logical elements. In response to the prompt "ORDER=," the operator specifies "First," thereby declaring that Format Definition Construct 68 will contain at least one column to specify the format characteristics of the first depth one child.

Those skilled in the art should appreciate that other options such as second, repeat, loop, etc. are also available to the operator as responses to both the "DEPTH=" and "ORDER=" prompts. Any known selection process may be utilized.

Those skilled in the art of computer programming should appreciate that the responses to the various prompts may be accomplished by generating a program which places the cursor at the response area and that a function key or other key may be utilized to cycle through the available choices. When a desired choice appears, the operator may select that choice by depressing a designated key on the keyboard. Application 62 will then build a Format Definition Construct 68 within Format Definition Shell 66. In response to the prompt "FORMAT=," the operator specifies "Ordered," thereby declaring that the format characteristics for any first child at depth one is to have the format characteristic associated with the notion of ordered. The term ordered is utilized herein to designate an ordered list attribute such as numbered.

Those skilled in the art of list formatting may easily identify the list characteristics that may be specified to structure ordered, unordered, or simple lists. Of course, at this stage of the definition, the connection between an individual logical element and the definition does not exist and in fact, Format Definition Construct 68 may be utilized by any number of different logical elements if its specified format characteristics suit the needs of the operator with regard to those elements.

Application 62 next places entry 70 into Format Definition Construct 68 to specify that the first child of a selected logical element for any of the parents specified by Format Definition Construct 68 is to be formatted according to the characteristics associated with the notion of ordered.

The operator may enter multiple arguments after the "PARENT=," "DEPTH=," "ORDER=," and "FORMAT=" prompts to complete Format Definition Construct 68. This is illustrated with reference to FIG. 5 which depicts a computer screen 58 which illustrates the connection of a logical element to a format in accordance with the method of the present invention.

Figures 5, 6:
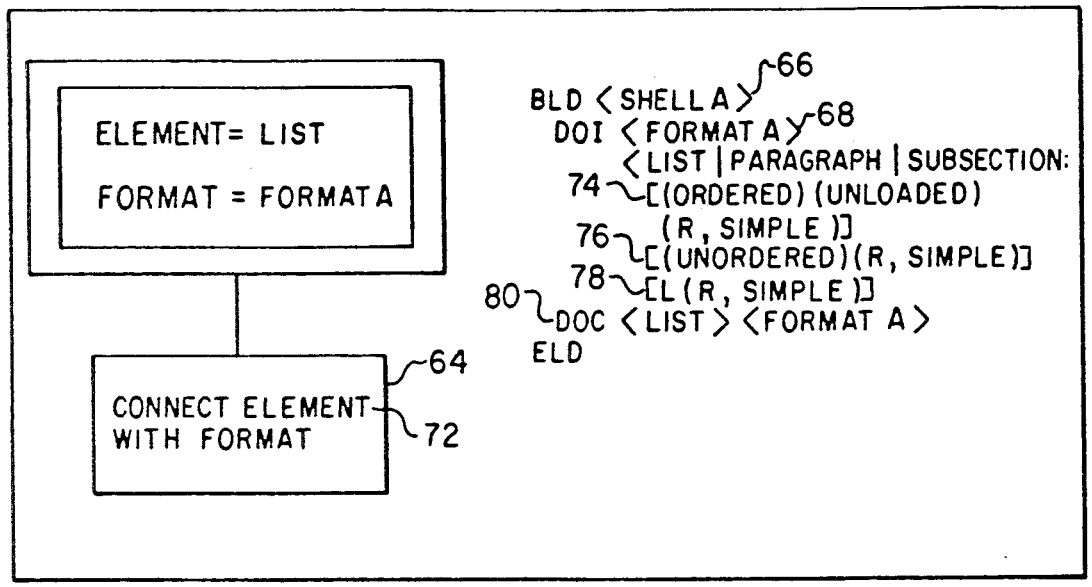
FIG. 5 is an illustration of a computer screen depicting the connection of a logical element to a format in accordance with the method of the present invention.
FIG. 6 is a schematic representation of a format definition table constructed in accordance with the format selected in FIG. 5.

As may be seen in FIG. 5, Format Definition Construct 68 was created by entering more than one argument for each of the prompts. The illustrated example assumes that the format characteristics within a group are in child order. That is, the first set of characteristics are applied to the first child for a parent element, the second set of characteristics applies to the second child of a parent and so forth.

The depicted example also assumes that the groups are in depth order, that is, the first group of characteristic sets is for depth one, the second group of characteristics is for depth two, and so forth. These order and depth values may be saved as part of the aforementioned characteristics.

Still referring to FIG. 5, it may be seen that characteristic group 74 includes three characteristic sets; characteristic group 76 includes two characteristic sets; and, characteristic group 78 includes one characteristic set. The parent elements for Format Definition Construct 68 are List, Paragraph, and Subsection. All of this information was preferably entered by the operator utilizing the prompts which are depicted in FIG. 4.

FIG. 5 illustrates a computer screen 58 which depicts the prompts which are utilized to receive information from the operator to connect logical element description 80 to Format Definition Construct 68 in Format Definition Shell 66. As is illustrated, in response to the prompt "ELEMENT=," the operator has selected "List." In response to the prompt "FORMAT=," the operator has selected "FormatA." Application 72 which is now running on computer device 64 will then connect logical element description 80 to Format Definition Construct 68. When an instance of a List is created, Format Definition Construct 68 will then be utilized to direct the formatting of data for that List.

Referring now to FIG. 6, there is depicted a schematic representation of a Format Definition Table which has been constructed in accordance with the format selected in FIG. 5. As may be seen, Format Definition Table 82 depicts the characteristics which will be utilized to format Lists whose parents are List, Paragraph, or Subsection.

Format Definition Table 82 matches the specified format characteristics contained within Format Definition Construct 68. This table illustrates clearly that the first depth one List child of a Paragraph, List or Subsection parent is to be formatted as an ordered List. The second List child will be formatted as an unordered List, and the third List child will be formatted as a simple list. If there are fourth and subsequent Lists children, they will be formatted as simple Lists. This has been specified by the "R" which is listed before "Simple" in characteristic group 74 of FIG. 5 and as indicated at entry 84 of table 82.

The first List child at depth two will be formatted as an unordered list and all remaining List children will be formatted as simple lists. Similarly, all List children at depth three will be formatted as simple Lists. If there are fourth and subsequent depth levels for List children, the above formatting sequence will be repeated due to the fact that the first entry in characteristic group 78 is an "L," which specifies that depth level format characteristics for levels greater than three are to be determined by looping through the existing groups where characteristic group 74 applies to depths one, four, seven and so forth; characteristic group 76 applies to depths two, five, eight and so forth; and, characteristic group 78 applies to depths three, six, nine and so forth. This looping concept is also noted within characteristic table 82 as line 86.

Figure 7:
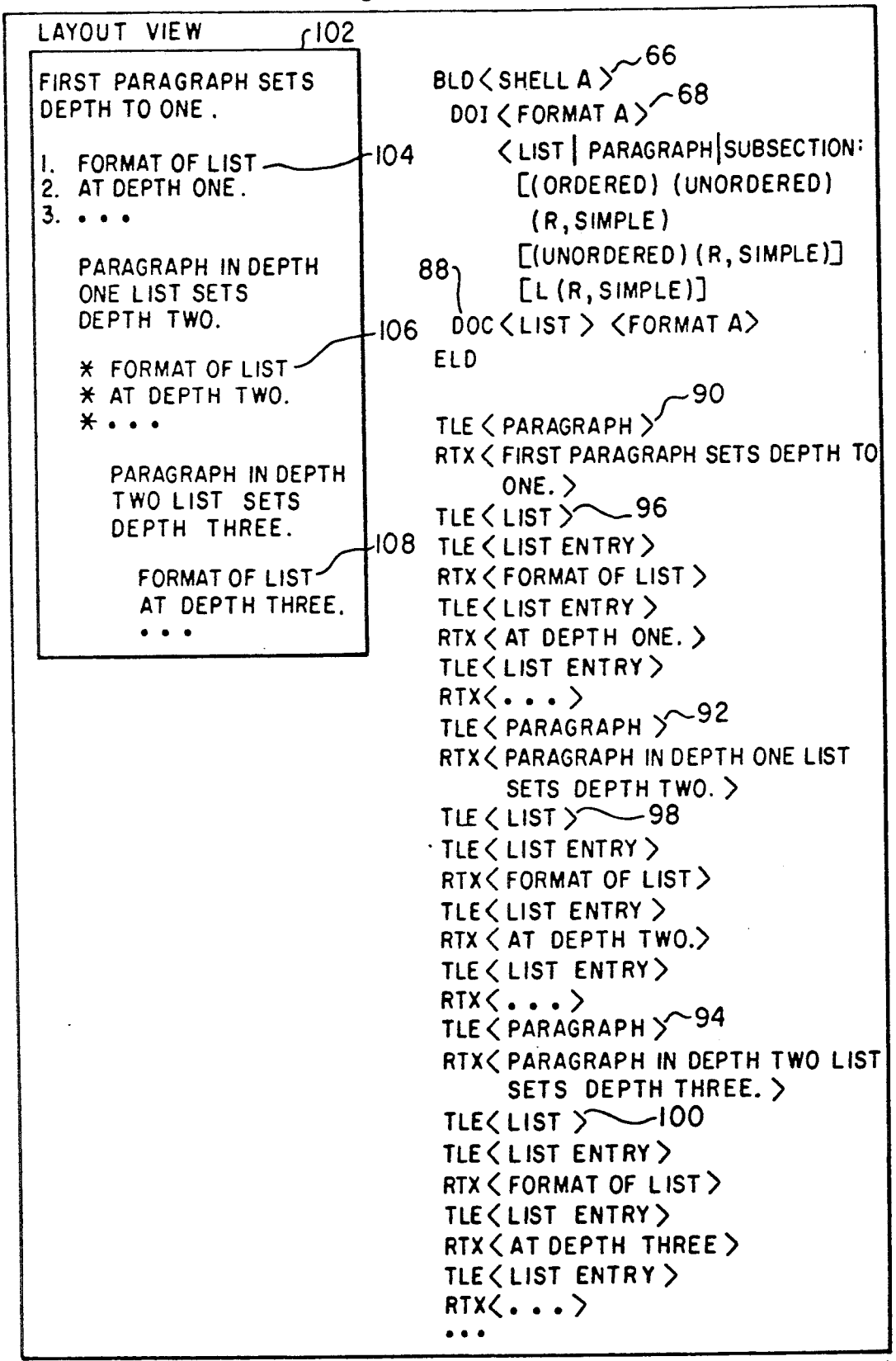
FIG. 7 illustrates a data stream representation of a document and a layout view of the image of that document constructed in accordance with the method of the present invention.

With reference now to FIG. 7, there is illustrated a data stream representation of a document and a layout view of the image of that document which is constructed in accordance with the method of the present invention. As is illustrated within the data stream representation within FIG. 7, List Definition 88 is linked to Format Definition Construct 68 with three Paragraphs 90, 92 and 94. Each Paragraph contains a List such as List 96 within Paragraph 90, List 98 within Paragraph 92 and List 100 within Paragraph 94. Also, List 96 contains Paragraph 92 and List 98 contains Paragraph 94. This is a nested recursive structure wherein Paragraph 90 and List 96 are at depth one, Paragraph 92 and List 98 are at depth two, and Paragraph 94 and List 100 are at depth three. The format for each List is determined by selecting the appropriate group and format character set from Format Definition Construct 68. In this case, List 96 is at depth one and is the first child of an acceptable parent (Paragraph). Therefore, List 96 is formatted as an ordered List, as depicted at reference numeral 104 within layout view 102.

Similarly, List 98 is the first child of an acceptable parent, but at depth two. Therefore, List 98 is formatted as an unordered List, as depicted at reference numeral 106 of layout view 102. Finally, List 100 is the first child of an acceptable parent, at depth three. Therefore, List 100 is formatted as a simple List, as depicted at reference numeral 108 of layout view 102.

Figure 8:
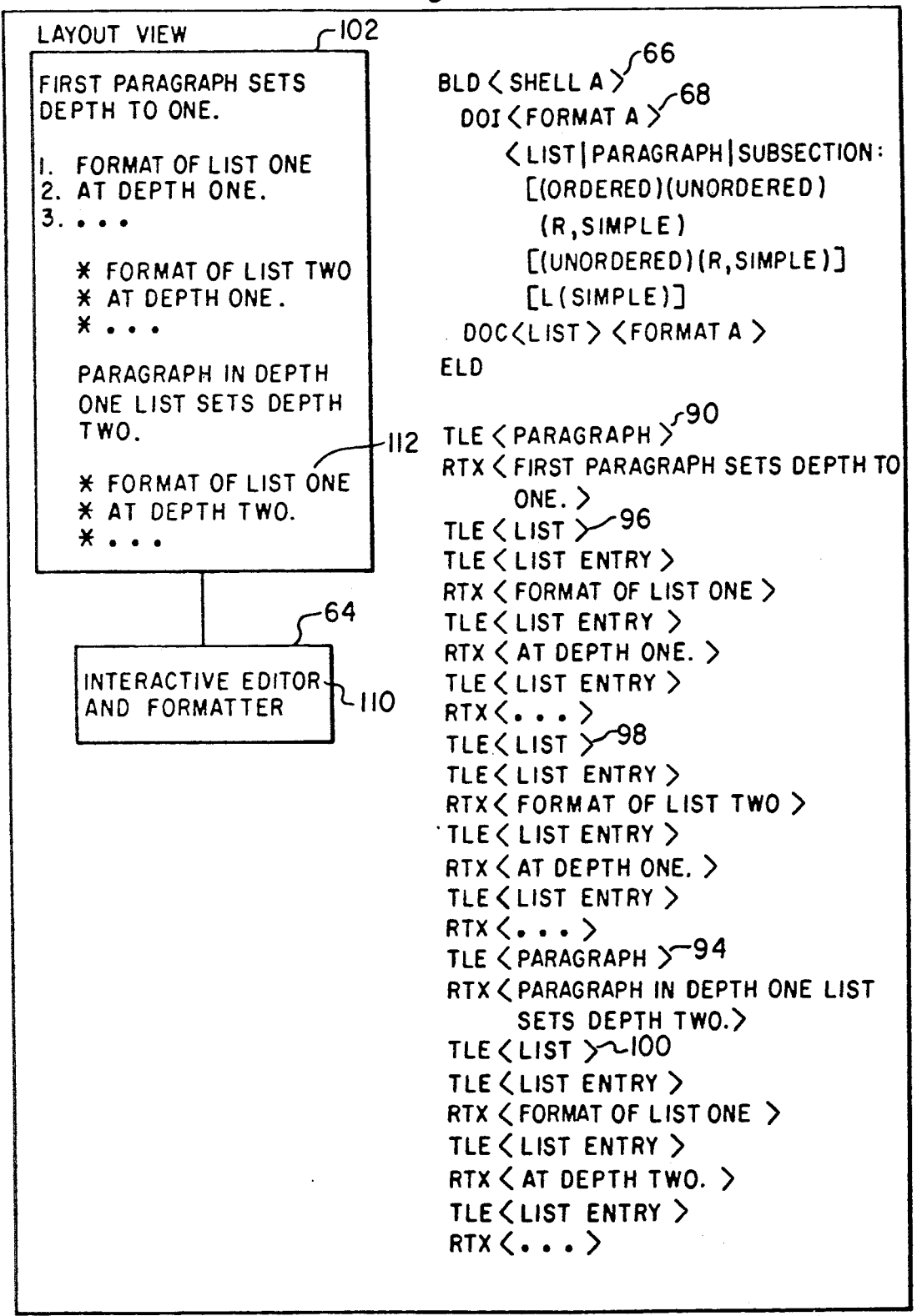
FIG. 8 illustrates a data stream representation of the document of FIG. 7 wherein a logical element has been deleted and the layout view of the resultant image.

Referring now to FIG. 8, there is depicted a data stream representation of the document of FIG. 7 wherein a logical element has been deleted, as well as the layout view of the resultant image. FIG. 8 illustrates what will happen automatically in accordance with the method of the present invention when an operator deletes a Paragraph.

Utilizing text editor 110, running on device 64, the operator has deleted Paragraph 92 of FIG. 7. The resultant data stream representation is seen in FIG. 8. By following the established rules within Format Definition Construct 68 for the formatting of List data, List 96 remains an ordered list since it is still the first child List at depth one. However, List 98 has become the second child at depth one due to the elimination of Paragraph 92 from the document previously illustrated in FIG. 7.

The format of List 98 does not change because the format for a second child List at depth one is the same as the format for a first child List at depth two. However, List 100 has now become the first child List at depth two. In this case, text editor 110 will automatically reformat List 100 without operator intervention due to the fact that a List at this depth is specified to be an unordered List by Format Definition Construct 68, whereas a first List at depth three (the former position of List 100) is specified to be a simple List. The change in format for List 100 is depicted within layout view 102 at reference numeral 112.

Figure 9:
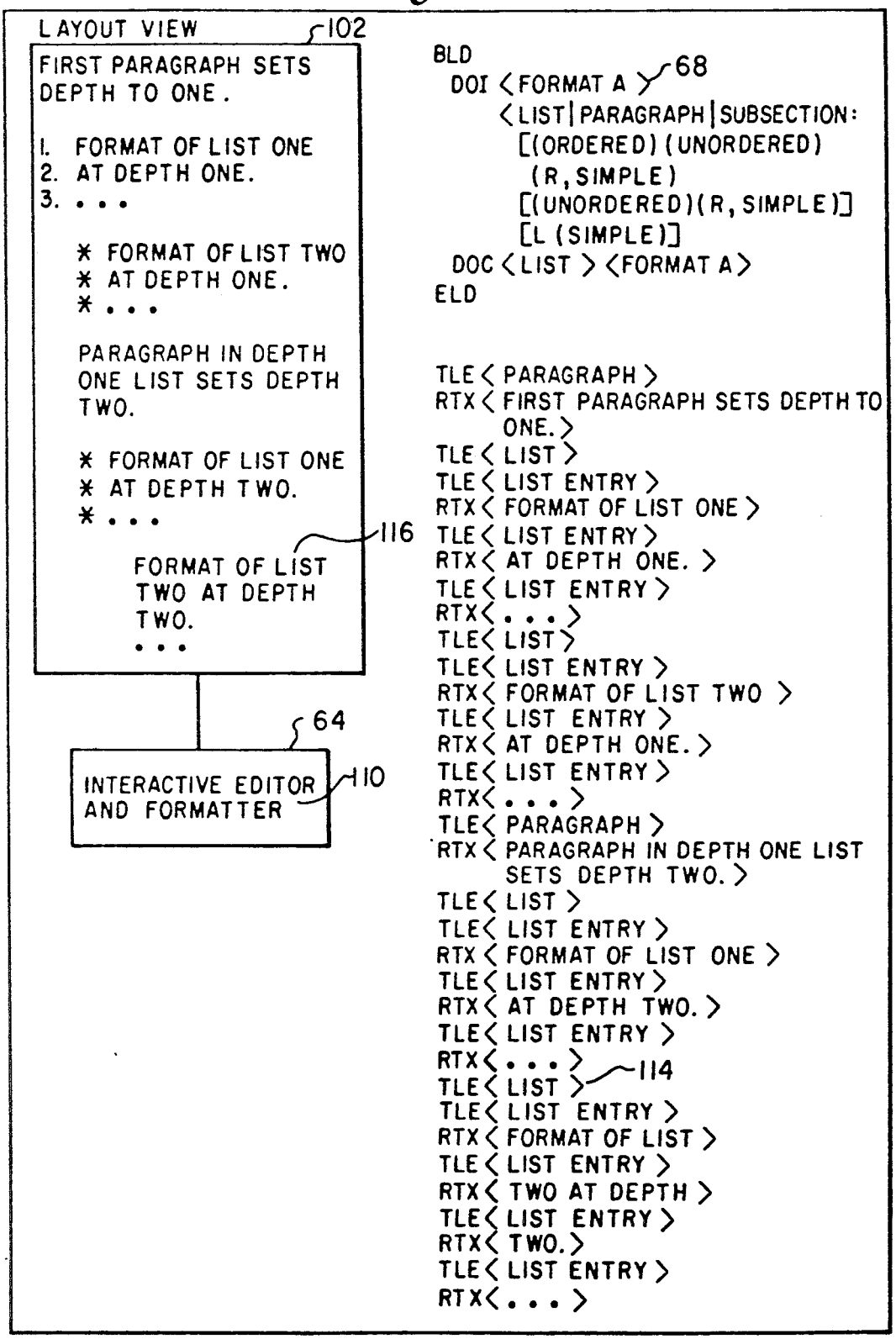
FIG. 9 depicts a data stream representation of the document of FIG. 7 wherein a logical element has been added and the layout view of the resultant image.

With reference now to FIG. 9, there is depicted a data stream representation of the document of FIG. 7 wherein a logical element has been added and a layout view of the resultant image. In the illustrated example, List 114 has been added to the previously illustrated document. Format Definition Construct 68 now specifies that a second child List at depth two is to have a simple List format. Text editor 110 will therefore automatically reformat List 114 as a simple List, as illustrated at reference numeral 116 within layout view 102.

Figure 10A:
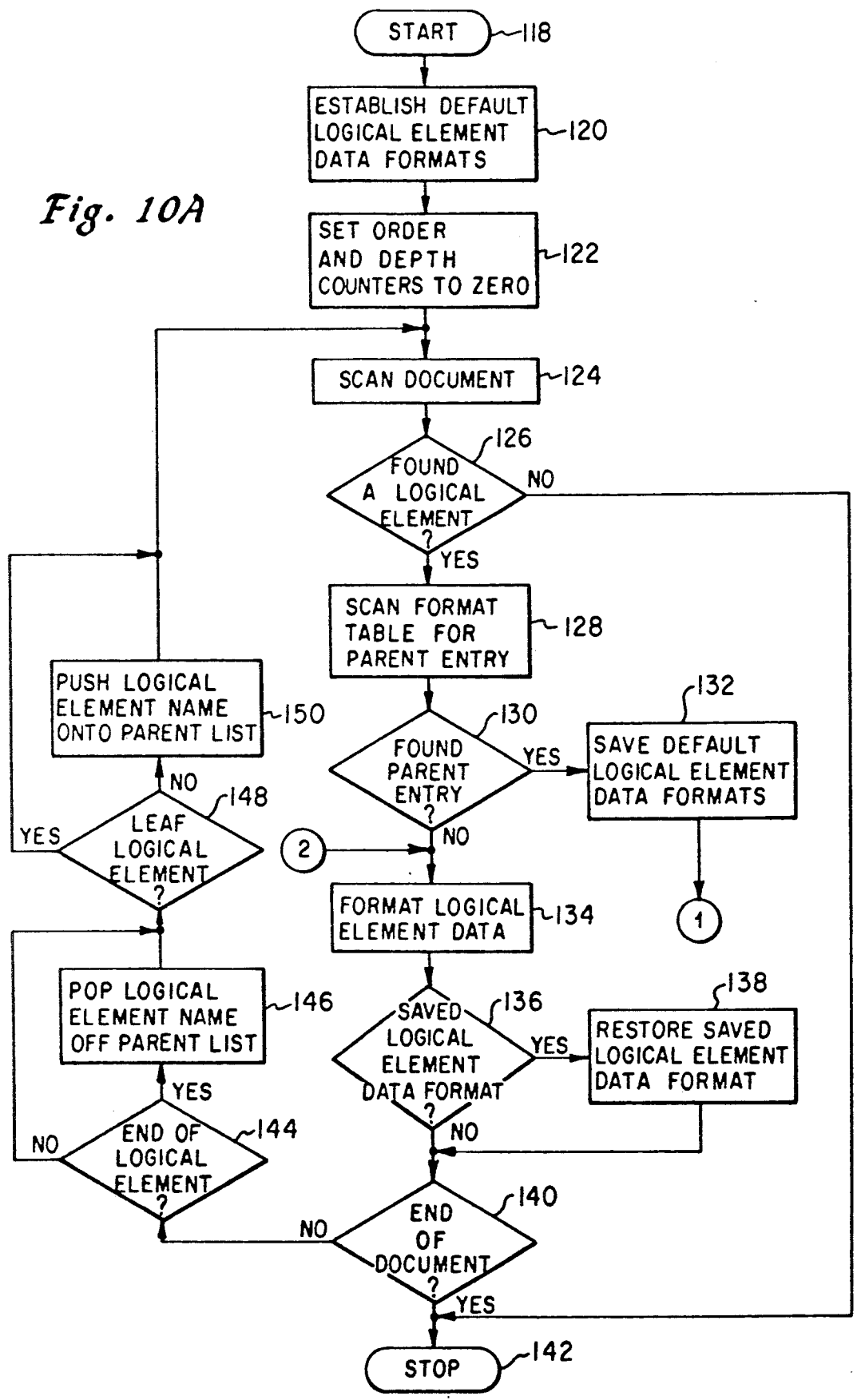
FIGS. 10A and 10B when considered together form a logic flow chart illustrating the logic of the process which dynamically selects a logical element format in accordance with the method of the present invention.
Figure 10B:
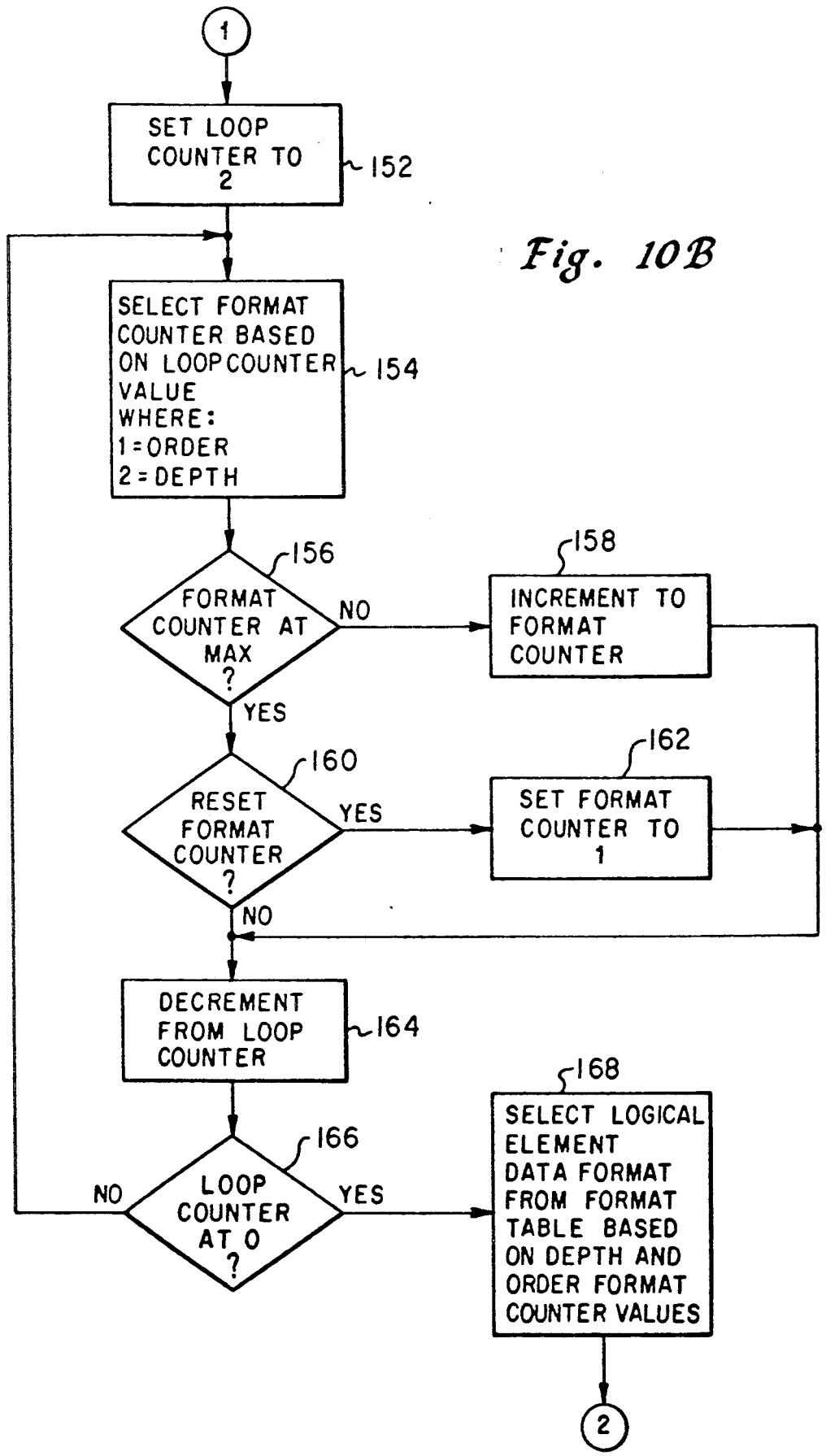

Referring now to FIGS. 10A and 10B, there is depicted a logic flow chart which illustrates the logic of the process which dynamically selects a logical element format in accordance with the method of the present invention. As may be seen, the process begins as illustrated in block 118 and thereafter block 120 depicts the establishment of a default logical element data format. Next, block 122 illustrates the setting of the order and depth counters to zero. Those skilled in the art will appreciate upon reference to the foregoing specification that order and depth counters will be utilized to track the order of appearance and depth within a recursively nested group of logical elements in order to assign an appropriate format.

Next, block 124 depicts the scanning of the document data stream. Thereafter, block 126 depicts a determination of whether or not a logical element has been located. If not, the process proceeds to block 142 and terminates. In the event a logical element has been located, as determined by block 126, then block 128 illustrates the scanning of the format table for a parent entry.

Next, block 130 depicts the determination of whether or not a parent entry has been located and if so, the process proceeds to block 132 which depicts the storing of the default logical element data formats. In the event no parent entry has been located, as determined by block 130, the process proceeds to block 134 which is utilized to illustrate the formatting of the logical element data in accordance with the default format. Thereafter, block 136 illustrates the determination of whether or not the logical element data format has been saved, and if so, block 138 illustrates the restoring of the saved logical element data format. In the event the logical element data format has not been saved, then block 140 illustrates a determination of whether or not the end of the document has been reached. If so, the process terminates as illustrated in block 142.

If block 140 indicates that the end of the document has not been reached, then block 144 illustrates a determination of whether or not the process has reached the end of a logical element. If the end of a logical element has occurred, then block 146 illustrates the removal of that logical element name from the parent list. Thereafter, or if the end of a logical element has not been reached, as determined by block 144, block 148 illustrates a determination of whether or not the logical element is a leaf element. That is, an element which has no descendant elements. If not, block 150 depicts the entry of the logical element name onto the parent list. Thereafter, or in the event the logical element just examined is a leaf element, the process returns to block 124 to continue scanning the document for additional logical elements.

Referring again to block 132, after the default logical element data format has been saved when a parent entry has been found, the process passes to block 152 which depicts the setting of the loop counter to two. Thereafter, block 154 illustrates the selecting of a format counter based upon the loop counter value where a loop counter value equal to one indicates order and a loop counter value equal to two indicates depth.

Next, block 156 illustrates a determination of whether or not the format counter is at maximum. Maximum for the depth counter will be equal to the number of depth entries in the format table and maximum for the order counter will be equal to the number of entries for the selected depth entry. If the format counter is not at maximum, then block 158 illustrates the incrementing of the format counter and the process passes to block 164.

In the event the format counter is at maximum, then block 160 illustrates the determination of whether or not the format counter should be reset. This is determined by a reset operator which is contained within the format table. In the event the format counter should be reset, then block 162 illustrates the setting of the format counter to one and the process returns to block 164.

In the event the format counter does not need to be reset or after it has been reset, then block 164 illustrates the decrementing of the loop counter. As noted above, block 152 illustrates the setting of the loop counter initially to two so that the depth format counter may be utilized. During the next iteration through the process after decrementing the loop counter, block 166 illustrates a determination of whether or not the loop counter has reached zero. In the event the loop counter has not reached zero (the loop counter is at one) the process returns to block 154 where the order format counter is selected. Thereafter, the process continues until it returns to block 164 and the loop counter is decremented to a zero value.

In the event the loop counter reaches zero, as determined by block 166, the process passes to block 168 wherein the selection of a logical element data format from the format table is illustrated, based upon the depth and order format counter values. Thereafter, the process returns to block 134 of FIG. 10A.

Upon reference to the foregoing, those skilled in the art will appreciate that the Applicants have provided a method of dynamically selecting logical element data formats from a group of recursively nested logical elements which permits data formatting to automatically conform to changes in logical element nesting levels as the document is edited. Further, the data formatting will automatically conform to changes in logical element data formatting specifications as the logical element data format list is modified, thus providing a consistent document appearance without time consuming visual checking and explicit data format modifications. In this manner, the applicants' method will substantially reduce the time necessary to produce and image a consistently formatted document within a data processing system.

While the invention has been particularly shown and described with reference to a preferred embodiment, it will be understood by those skilled in the art that various changes in form and detail may be made therein without departing from the spirit and scope of the invention.

We claim:

1. A method in a data processing system for automatically assigning logical element data formats in a document having recursively nested logical elements therein, said method comprising the steps of:
    establishing a logical element data format which corresponds to the order of appearance of a logical element within a nested relationship and the level of that logical element within said nested relationship;
    determining the order of appearance and the level within a nested relationship for each logical element within said document; and
    assigning a logical element data format for each logical element within said document based upon said determined order of appearance and level within said relationship.

2. The method in a data processing system for automatically assigning logical element data formats in a document having recursively nested logical elements therein according to claim 1, further including the steps of:
    relocating a logical element within said document;
    determining the order of appearance and the level within a nested relationship for said relocated logical element; and
    assigning a logical element data format for said relocated logical element based upon said determined order of appearance and level within said nested relationship.

3. A method in a data processing system for automatically assigning a logical element data format to a logical element which is recursively nested within a document said method comprising the steps of:
    establishing a data format associated with each possible order of appearance and level of a logical element within a nested relationship; and
    as a document is created, automatically assigning a data format for each logical element based upon its order of appearance and level within a nested relationship.

4. The method in a data processing system for automatically assigning a logical element data format to a logical element which is recursively nested within a document according to claim 2, wherein said step of establishing a data format associated with each possible order of appearance and level of a logical element within a nested relationship is performed interactively by prompting a user of said data processing system to input format style and characteristics for logical elements based upon the order of appearance and level within a nested relationship of each logical element.

5. A data processing system for automatically assigning logical element data formats in a document having recursively nested logical elements therein, said data processing system comprising:
    means for establishing a logical element data format which corresponds to the order of appearance of a logical element within a nested relationship and the level of that logical element within said nested relationship;
    means for determining the order of appearance and the level within a nested relationship for each logical element; and
    means for assigning a logical element data format for each logical element within said document based upon said determined order of appearance and level within said nested relationship.

6. A data processing system for automatically assigning a logical element data format to a logical element which is recursively nested within a document, said data processing system comprising:

means for establishing a data format associated with each possible order of appearance and level of a logical element within a nested relationship; and
    means for dynamically assigning a data format for each logical element based upon its order of appearance and level within a nested relationship as a document is created.

* * * * *